United States Patent [19]

Schulte et al.

[11] Patent Number: 4,791,016

[45] Date of Patent: Dec. 13, 1988

[54] STRETCHED POLYCARBONATE FILMS FILLED WITH CARBON BLACK

[75] Inventors: Bernhard Schulte, Krefeld; Werner Tischer, Dormagen; Werner Waldenrath, Cologne; Hans Kaloff, Dormagen, all of Fed. Rep. of Germany

[73] Assignee: Bayer Aktiengesellschaft, Leverkusen, Fed. Rep. of Germany

[21] Appl. No.: 16,916

[22] Filed: Feb. 20, 1987

Related U.S. Application Data

[63] Continuation of Ser. No. 661,769, Oct. 17, 1984, abandoned.

[30] Foreign Application Priority Data

Oct. 22, 1983 [DE] Fed. Rep. of Germany ....... 3338499
Nov. 17, 1983 [DE] Fed. Rep. of Germany ....... 3341557

[51] Int. Cl.⁴ .............................................. H01B 1/24
[52] U.S. Cl. .................................... 428/220; 264/105; 264/288.4; 428/339; 524/496; 524/611; 252/511
[58] Field of Search ..................... 264/104, 105, 288.4; 252/500, 502, 511; 428/220, 412, 332, DIG. 910, 339; 524/496, 611

[56] References Cited

U.S. PATENT DOCUMENTS

| | | | |
|---|---|---|---|
| 3,005,236 | 10/1961 | Reichle et al. | 18/48 |
| 3,028,365 | 4/1962 | Schnell | 260/47 |
| 3,062,781 | 11/1962 | Bottenbruch | 260/47 |
| 3,275,601 | 9/1966 | Schnell | 260/47 |
| 3,329,755 | 7/1967 | Reichardt et al. | 264/210 |
| 3,445,561 | 5/1969 | Huff et al. | 264/288 |
| 3,525,712 | 8/1970 | Uramer | 525/462 |
| 3,544,514 | 12/1970 | Schnell | 525/468 |
| 3,654,182 | 4/1972 | Hayes | 252/415 |
| 3,654,187 | 4/1972 | Tanaka et al. | 252/511 |
| 3,697,450 | 10/1972 | Takenaka et al. | 252/511 |
| 4,185,009 | 1/1980 | Idel et al. | 528/171 |
| 4,343,756 | 8/1982 | Weber et al. | 264/288.4 |

FOREIGN PATENT DOCUMENTS

| | | | |
|---|---|---|---|
| 0720314 | 2/1969 | Belgium . | |
| 0693056 | 8/1964 | Canada | 264/288.4 |
| 1155289 | 10/1983 | Canada . | |
| 1164644 | 3/1964 | Fed. Rep. of Germany . | |
| 1179355 | 10/1964 | Fed. Rep. of Germany . | |
| 1190167 | 4/1965 | Fed. Rep. of Germany . | |
| 1255912 | 12/1967 | Fed. Rep. of Germany . | |
| 51-159149 | 7/1978 | Japan . | |
| 0903603 | 8/1962 | United Kingdom | 264/288.4 |
| 1066187 | 4/1967 | United Kingdom | 264/288.4 |

*Primary Examiner*—Jan H. Silbaugh
*Assistant Examiner*—Hubert C. Lorin
*Attorney, Agent, or Firm*—Gene Harsh; Joseph C. Gil; Aron Preis

[57] ABSTRACT

A polycarbonate film obtained by dispersing carbon black in a solution of thermoplastic aromatic polycarbonate, producing a cast film, and subsequently stretching the cast film, is characterized in that its elongation at break is greater than that of a corresponding unstretched similarly filled film having an identical thickness.

7 Claims, No Drawings

STRETCHED POLYCARBONATE FILMS FILLED WITH CARBON BLACK

This application is a continuation of application Ser. No. 661,769 filed Oct. 17, 1984, now abandoned.

The invention relates to a process for the preparation of polycarbonate films 0.002 mm to 0.4 mm thick containing carbon black or graphite, in particular carbon black, in an amount of 5 to 45% by weight, preferably 10 to 40% by weight and especially 20 to 35% by weight, characterised in that corresponding amounts of carbon black or graphite, preferably carbon black, are dispersed in solutions of thermoplastic, aromatic polycarbonates with an $\overline{M}w$ (weight-average molecular weight) of 20,000 to 300,000, cast films 0.004 mm to 0.42 mm, preferably 0.006 mm to 0.3 mm and in particular 0.01 mm to 0.2 mm, thick are produced in a known manner and these are then stretched monoaxially or biaxially by at least 5% to at most 250%, preferably by 10% to 200%, by known processes.

The present invention also relates to the polycarbonate films obtainable by the process according to the invention.

The polycarbonate films obtainable by the process according to the invention have a surface resistivity of 1 to $10^9 \Omega$, preferably of 5 to $10^6 \Omega$ and in particular 10 to $10^3 \Omega$.

The polycarbonate films obtainable according to the invention can be used in the electrical sector, in particular for protecting electrical components from static charges, for shielding electromagnetic radiation and for resistance heating in electrical components.

Stretching of polycarbonate films is known in principle. (See, for example, DE-AS (German Published Specification) No. 1,179,355, DE-AS (German Published Specification) No. 1,164,644, DE-AS (German Published Specification) No. 1,190,167, U.S. Pat. No. 3,005,236, DE-AS (German Published Specification) No. 1,435,459 and DE-AS (German Published Specification) No. 1,255,912).

Polycarbonate films with high contents of conductive material, such as, for example, carbon black, have already been described. (See Belgian Patent Specification No. 720,314, U.S. Pat. No. 3,654,187, U.S. Pat. No. 3,697,450 and Japanese No. 159,149, Japanese priority No. 28.12.76), but films of this type are produced only by a casting method (see the Belgian patent specification or the U.S. patent specifications).

Polycarbonates which contain small amounts of carbon fibres or graphite fibres and can likewise be processed to films, but again only by a casting method, are also known. (See EP-OS (European Published Specification) No. 0,032,379).

Surprisingly, it has now been found that polycarbonate films filled with carbon black or graphite which are produced by known casting methods and then stretched by known processes have a particularly good pattern of properties in respect of electrical and mechanical characteristics, in particular, on the one hand, very uniform surface resistivities, that is to say low standard deviations in the surface resistivity (measured in $\Omega$) or volume resistivity (measured in $\Omega$ cm) over large areas, and, on the other hand, little change in the resistivities over a period of storage time, and in addition small variations in thickness, high surface glosses, good shrinkage properties, very low contents of residual solvent, without an additional separate after-drying, and, finally, high elongation at break and tensile strength.

The polycarbonate films produced according to the invention are thus superior to the non-stretched cast polycarbonate films of the same thickness and same filler content which have hitherto been known, which is of decisive advantage for many applications, in particular in view of the elongation at break and tensile strength, on the one hand, and the behaviour of the surface resistivity on storage, on the other hand.

The expert was not to expect that, especially at filler contents of 10 percent by weight or more, stretching leads to films of good and reproducible quality, in particular in the region of very small film thicknesses of, for example, below 0.05 mm, it being particularly unexpected that the elongation at break of the filled polycarbonate films is improved by the stretching, whilst the stretching of corresponding non-filled polycarbonate films causes a reduction in the elongation at break.

Thermoplastic aromatic polycarbonates in the context of the present invention are the polycondensates obtainable by reaction of diphenols, in particular dihydroxydiarylalkanes, with phosgene or diesters of carbonic acid, dihydroxydiarylalkanes in which the aryl radicals in the o- and/or m-position relative to the hydroxyl group carry methyl groups or halogen atoms also being suitable, in addition to the unsubstituted dihydroxydiarylalkanes.

Examples of suitable diphenols are hydroquinone, resorcinol, 4,4'-dihydroxydiphenyl, bis-(hydroxy-phenyl)alkanes, such as, for example, $C_1$–$C_8$-alkylene- or $C_2$–$C_8$-alkylidene-bisphenols, bis-(hydroxy-phenyl)-cycloalkanes, such as, for example, $C_5$–$C_{15}$-cycloalkylene- or $C_5$–$C_{15}$-cycloalkylidine-bisphenols, and bis-(hydroxy-phenyl) sulphides, ethers, ketones, sulphoxides or sulphones, furthermore $\alpha,\alpha'$-bis-(hydroxy-phenyl)-diisopropylbenzene and the corresponding nuclear-alkylated or nuclear-halogenated compounds. Polycarbonates based on 2,2-bis-(hydroxyphenyl)propane (bisphenol A), 2,2-bis-(4-hydroxy-3,5-dichlorophenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethylbisphenol A) and 1,1-bis-(4-hydroxy-phenyl)-cyclohexane (bisphenol Z), and those based on trinuclear bisphenols, such as $\alpha,\alpha'$-bis-(4-hydroxyphenyl)-p-diisopropylbenzene, are preferred. Other diphenols which are suitable for the preparation of the polycarbonates are described, for example, in U.S. Pat. Nos. 3,028,365, 3,062,781 and 3,275,601.

Apart from linear polycarbonates, branched polycarbonates are also suitable; as is known, such branched polycarbonates can be prepared by incorporating small amounts, preferably amounts of between 0.05 and 20 mole-%, based on the diphenols employed, of compounds which are trifunctional or more than trifunctional, for example those with three or more than three phenolic hydroxyl groups (in this context, see, for example, DE-OS (German Published Specification) No. 1,570,533, DE-OS (German Published Specification) No. 1,595,762 and DE-OS (German Published Specification) No. 2,500,092). Examples of some of the compounds with three or more than three phenolic hydroxyl groups which can be used are 1,3,5-tri-(4-hydroxyphenyl)benzene, 1,1,1-tri-(4-hydroxyphenyl)-ethane, 2,4-bis-(4-hydroxyphenyl-isopropyl)-phenol, 2-(4-hydroxyphenyl)-2-(2,4-dihydroxyphenyl)-propane, hexa-(4-(4-hydroxyphenylisopropyl)phenyl)-orthoterephthalic acid ester, tetra-(4-hydroxyphenyl)-methane, tetra-(4-(4-hydroxyphenylisopropyl)-phenoxy)-methane and 1,4-bis-(4'-4"-dihydroxytriphenyl)-methyl)-benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

Preferred polycarbonates are those of bisphenol A which contain 0 to 5 mole-%, based on moles of diphenols, of cocondensed bisphenol Z.

The polycarbonates which are suitable according to the invention should have average molecular weights $\overline{M}w$ (weight-average) resulting from relative viscosities of 1.2 to 3.0, preferably 1.5 to 2.5 and in particular 1.6 to 2.4. (The relative viscosities are measured in a known manner on 0.5 g/100 ml of $CH_2Cl_2$ solutions at 25° C.). $\overline{M}w$ values of between about 20,000 and about 300,000, preferbly between about 40,000 and 250,000 and in particular between 60,000 and 200,000 result from these viscosities. (GPC molecular weight determination).

The polycarbonates which are suitable according to the invention are prepared by known processes. The molecular weight is adjusted in a known manner with chain stoppers, such as phenol, halogenophenols or alkylphenols, in the known amounts.

Carbon blacks which are suitable according to the invention are gas carbon blacks, furnace carbon blacks or flame soot with average primary particle sizes, which are in general determined by electron microscopy, of below 200 nanometers (nm), preferably below 100 nanometers (nm), and in particular with an average primary particle size of less than 50 nanometers; graphites which are suitable according to the invention are graphite powders or graphite dusts, which are available, for example, as electrode graphite in a wide particle spectrum with particle diameters of up to 5 mm, graphite powders with average particle sizes of up to 1 mm, especially up to 0.5 mm, preferably being used; the graphite particles are further comminuted and very finely dispersed in the polycarbonate solution in the manner described below.

Known, so-called conductivity carbon blacks which, in addition to having a very low primary particle size, have a high external and internal surface area, that is to say a high porosity and hence high BET surface areas with $N_2$ adsorption and high dibutyl phthalate (DBP) adsorption values, and furthermore are highly structured, that is to say exhibit marked agglomeration or aggregation of individual carbon black particles to larger structures, such as, for example, chains, the BET surface areas in the carbon blacks generally being greater than 20 $m^2/g$ and the DBP adsorption being greater than 40 ml per 100 g of carbon black, are preferably used.

Conductivity carbon blacks with BET surface areas of more than 50 $m^2/g$ and DBP adsorptions of more than 80 ml/100 g with average primary particle sizes of less than 50 nanometers (nm) are particularly suitable. Such electrically conductive carbon blacks are available as commercially available special carbon blacks with pronounced structures and high electrical conductivities.

Carbon black or graphite is incorporated into the thermoplastic polycarbonates via solutions of polycarbonates, either directly into the reaction solutions at the end of the process for the preparation of the polycarbonate, or into separately prepared polycarbonate solutions after the polycarbonate has been isolated, it being possible for the electrically conductive additives either to be initially dispersed or precomminuted by themselves in suitable media before the polycarbonates are dissolved, or to be incorporated and finely dispersed in the presence of the dissolved polycarbonate. The possibilities can also be combined, in which case very fine dispersion is advantageously achieved stepwise using known dispersion equipment, such as, for example, rotor-stator apparatuses, dissolver discs, high pressure homogenisers, ultrasonic sonars or bead mills with, for example, steel beads 0.5 to 3 mm in diameter.

Suitable media for the preparation of the dispersions are chlorinated hydrocarbons, such as, for example, methylene chloride, ethylene chloride, chloroform or chlorobenzene, but it is also possible for additives of, for example, methanol, ethanol, acetone, toluene, xylene, ethylene glycol and its monoethers or diethers, propylene glycol and its ethers, glycerol, lauryl alcohol and its ethers and esters or phthalic acid esters also to be used, those additives, such as, for example, toluene or ethers of propylene glycol or ethylene glycol, which lead to an increase in the crystallinity of the polycarbonate during the production of the cast films, being preferred.

The dispersions which can thus be prepared in the abovementioned organic media, which in general have solids contents of polycarbonate and carbon black or polycarbonate and graphite of 4 to 25% by weight, preferably 6 to 18% by weight, are usually also subjected to fine filtration with average mesh widths of below 100 $\mu$m, preferably below 50 82 m, in order to remove particle agglomerates.

If carbon black is used, the dispersions thus filtered generally have particle sizes of only less than 10 $\mu$m (measurement by means of ultracentrifuge or laser diffraction), preferably of less than 5 $\mu$m and, in the ideal case of less than 2 $\mu$m.

The dispersions can be cast to film thicknesses of 0.004 to 0.42 mm, preferably 0.006 to 0.3 mm and in particular 0.01 to 0.2 mm, on belt or drum casting machines with known casting units, such as doctor-type casters or pressure casters, the polycarbonate films produced having a degree of filling of 5 to 45% by weight, preferably 10 to 40% by weight and in particular 20 to 35% by weight (based on the total solid) and a solvent content of 0.2 to 12% by weight (test standard VDE 0345), preferably 0.5 to 8% by weight, which can also be adjusted in a controlled manner by predrying before the subsequent stretching process.

These filled cast polycarbonate films are stretched monoaxially or biaxially on industrial stretching devices, monoaxial stretching in the longitudinal direction, that is to say in the direction of casting of the cast film, being preferred. Known industrial stretching machines equipped with rolls which can be heated, are suitable here, stretching being achieved by single-nip stretching, that is to say between a heated roll (1) with a feed rate $V_1$ and heated roll (2) with the highest temperature, the so-called stretching temperature, which is in general achieved by oil heating, and a delivery rate $V_2$ in a nip about 3 to 10 mm wide, the stretching ratio $V_1:V_2$ being varied from 1:1.05 to 1:3.5, preferably from 1:1.1 to 1:3.0 and in particular from 1:1.2 to 1:2.5. A third roll with a lower temperature than the stretching temperature is generally connected downstream, for heat-setting.

The stretching process can also be carried out by multi-nip stretching, stretching machines with several driven rolls of different speeds and temperatures being used and non-driven heated rolls being included within the stretching zones to even out the stretching process. The diameter of the rolls can be varied from, for example, 40 to 300 mm, and in general the surface of the stretching rolls is roughened by blasting, or plastic-coated or ceramic-coated rolls are used for better adhesion. The temperature of the stretching roll heated to the highest temperature is designated the so-called stretching temperature $T_s$, and is varied in the range from 170° to 250° C., preferably from 180° to 230° C.

As already mentioned above, the polycarbonate films which are obtainable according to the invention are used in the electrical sector, for example for packaging and hence for protection of transistors or bipolar semiconductors from static discharging. The polycarbonate films obtainable according to the invention are thus suitable for equipment containing digital displays, such as, for example, digital electronic components in automobiles, toys, computers, clocks and the like. The polycarbonate films obtainable according to the invention can furthermore be used for packaging in photography or for sheathing cables, such as, for example, high voltage cables or ignition cables in automobiles, or for sheathing pipelines which should not freeze.

In particular applications, the polycarbonate films obtainable according to the invention exhibit advantages during metallisation, for example with nickel, cobalt, aluminium and the like, which can be achieved by vacuum metallising or by chemical routes, as a result of their low surface roughnesses and very low residual solvent contents.

The polycarbonate films obtainable according to the invention can advantageously be used directly for enclosing electrical components, and can then be firmly shrunk on under heat treatment in a known manner.

The surface resistances given in the following embodiment examples were measured at room temperature (20°–25° C.), and the dimension is $\Omega$ per square or $\Omega/sq$, these values scarcely differing from the surface resistivities, measured in $\Omega$, obtained according to test standard DIN 53,482.

EXAMPLE 1

A solution of a copolycarbonate of 2,2-bis-(4-hydroxyphenyl)-propane (99.5 mol %) and 1,1-bis-(4-hydroxyphenyl)-cyclohexane (0.5 mol %) of relative viscosity 2.16 (measured on 5 g per liter of $CH_2Cl_2$ at 25° C.) in $CH_2Cl_2$ containing 27% by weight of the total solids content of very finely dispersed conductivity carbon black with an average primary particle size of 30 nanometers (nm), a BET surface area of 254 $m^2/g$ and a DBP adsorption of 178 ml/100 g is filtered over a filter fabric with an average mesh width of 50 μm and cast on a drum casting machine to electrically conductive polycarbonate films about 40 μm, about 60 μm and 80 μm thick.

The carbon black-filled polycarbonate films about 60 μm and 80 μm thick are stretched monoaxially, with a residual solvent content of 3.0% (60 μm) or 4.1% (80 μm) weight loss according to VDE 0345 on a stretching machine with three rolls at a stretching temperature $T_s$ of 220° C., that is to say the temperature of the middle roll, which is heated to the highest temperature, by single-nip stretching by varying the feed rate ($V_1$) and the delivery rate ($V_2$) at a stretching ratio of $V_1:V_2=1:1.5$ (II) or 1:2.0 (III).

The mechanical strengths according to DIN 53,455 (200 mm/minute forward speed), shown in Table 1, are measured for the same film thickness and composition in comparison with the non-stretched 40 μm thick film (I).

TABLE 1

|  | Sample | | |
|---|---|---|---|
|  | I Comparsion | II Initial film thickness about 60 μm | III Initial film thickness about 80 μm |
| Sample thickness (μm) | 38–40 | 37–40 | 41 |
| Stretching temperature (°C.) | — | 220 | 220 |
| Stretching ratio ($V_1:V_2$) | unstretched | 1:1.5 | 1:2.0 |
| Residual solvent content (% VDE 0345) | 1.3* | 1.2 | 1.4 |
| Elongation at break (%) | 18 | 54 | 49 |
| Tensile strength (N/mm$^2$) | 72.1 | 91.5 | 100.3 |
| Surface resistance ($\Omega$/sq, four-point measurement, at room temperature of 20–25° C.) | 220 | 480 | 470 |

*after predrying of the comparison film in a circulating air drying cabinet.

The stretched, electrically conductive polycarbonate films with surface resistances of less than 500$\Omega$/sq show elongation values which are increased more than two-fold in comparison with the non-stretched film and likewise show higher tensile strength at the same film thickness of about 40 μm.

EXAMPLE 2

The carbon black/polycarbonate film about 60 μm thick produced according to Example 1 is stretched monoaxially by single-nip stretching at 220° C. and at various stretching ratios ($V_1:V_2$), the mechanical properties according to DIN 53,455 (200 mm/minute forward speed) of an approximately 30 μm thick film obtained at a stretching rate of 1:1.9 being compared with those of a non-stretched film with the same degree of carbon black filling and the same thickness (about 30 μm) (Table 2).

TABLE 2

Mechanical strength and surface resistances of stretched polycarbonate films containing carbon black at an initial film thickness of 56–60 μm. Stretching temperature 220° C.

| Stretching ratio ($V_1:V_2$) | 1:1.25 | 1:1.33 | 1:1.6 | 1:1.9 | Comparison unstretched | 1:2.5 |
|---|---|---|---|---|---|---|
| Sample thickness (μm) | 46–48 | 42–44 | 36 | 31 | 28–30 | 25 |
| Residual solvent content (% according to VDE 0345) | 1.6 | 1.3 | 1.15 | 1.1 | 1.3* | 1.0 |
| Elongation at break (%) | 51 | 58 | 60 | 48 | 18 | 31** |
| Tensile strength (N/mm$^2$) | 77.5 | 84.3 | 98.5 | 97.7 | 72 | 141** |
| Surface resistance ($\Omega$/sq;) | 260 | 325 | 500 | 670 | about 300 | 3220 |

*after predrying of the comparison film in a circulating air drying cabinet
**at a speed of 50 mm/minute (DIN 53,455); the other values are measured at a forward speed of 200 mm/minute.

The results in Table 2 show the unambiguous improvement in the mechanical strengths of a stretched carbon black-filled polycarbonate film with a high degree of carbon black filling of the polymer matrix (greater than 25% by weight) in comparison with the non-stretched comparison sample of the same composition at a film thickness of 30 μm.

The influence of the stretching ratio on the surface resistance, which can be varied in the range below 1,000Ω/sq at a stretching ratio up to 1:2 and increases to above 1,000 at a stretching ratio of, for example, more than 1:2.0, is also clear. Thus, independently of a new material composition of the filled polycarbonate film, different polycarbonate films with different surface resistance can be produced from a given film by varying the stretching ratio.

EXAMPLE 3

A carbon black/polycarbonate/methylene chloride dispersion (bisphenol A polycarbonate with a molecular weight, determined by membrane osmometry, of $M_n=49,000$), obtained by very fine dispersion, with a carbon black content of 25% by weight of the same conductivity carbon black as described in Example 1, based on the total weight of the solids polycarbonate+carbon black, is filtered, with a viscosity of 8,500 mPas (20° C.) over an edge filter with average edge spacings of 30 μm and then cast on a drum casting machine to a carbon black-containing polycarbonate film 150 μm thick, which is then stretched in the longitudinal direction (direction of casting) with a residual solvent content of 5.4% (VDE 0345) at 180° C. (I) or 220° C. (II) as the highest stretching roll temperature ($T_s$) in a ratio of feed rate to delivery rate of $V_1:V_2=1:1.5$. The mechanical properties, measured according to DIN 53,455 (200 mm/minute forward speed) of the resulting stretched conductive polycarbonate films about 100 μm thick are given in Table 3, the elongation values being more than three times greater than those of a non-stretched film 100 μm thick of the same composition.

A smaller rise in the surface resistivity is thus found at the higher stretching temperature, that is to say the surface resistance can likewise be adjusted in a controlled manner by varying the stretching temperature.

TABLE 3

Properties of stretched carbon black-filled polycarbonate films (thickness about 100 μm) - produced from polycarbonate films with an initial thickness of 150 μm - in comparison with a 100 μm cast film.

|  | I | II | Comparison non-stretched cast film |
| --- | --- | --- | --- |
| Stretching temperature (°C.) | 180 | 220 |  |
| Stretching ratio ($V_1:V_2$) | 1:1.5 | 1:1.5 |  |
| Sample thickness (μm) | 98-100 | 97-100 | 100-103 |
| Elongation at break (%) | 64 | 61 | 20 |
| Tensile strength (N/mm²) | 84.3 | 81.1 | 65.8 |
| Surface resistance (Ω/sq; at 20-25° C.) | 220 | 170 | 98 |

EXAMPLE 4

A 16 μm thick electrically conductive polycarbonate film of the copolycarbonate of Example 1, but with a $\eta_{rel}$ of 2.18, which has a degree of carbon black filling of 28% by weight (conductivity carbon black from Example 1) produced by casting a very finely dispersed carbon black/polycarbonate/methylene chloride dispersion, after prior filtration over 50μ fabric, is stretched monoaxially with a residual methylene chloride content of 1.5% by weight (weight loss ½ hour/160° C.) on a Hofmann und Schwabe stretching machine with three rolls at a stretching temperature of 220° C. and a stretching ratio of 1:2.0 by single-nip stretching. The film obtainable according to the invention, which is 7.8-8.3 μm thick, exhibits excellent mechanical strength of 32% elongation at break and 104.7 N/mm² tensile strength in a tensile test according to DIN 53,455 at a forward speed of 200 mm/minute. After the stretching process, the residual solvent content has been reduced to less than 0.3% (weight loss according to VDE 0345). The surface resistance (four-point measurement,) of the stretched polycarbonate film is 6560Ω/sq; this corresponds to a volume resistivity of about 5Ωcm.

COMPARISON EXAMPLE A

An electrically conductive non-stretched polycarbonate film of the carbon black/polycarbonate dispersion of the same composition and with a comparable thickness produced for comparison exhibits essentially lower strengths:

An approximately 8.5-9 μm thick electrically conductive polycarbonate film is produced by the casting method in the film composition and under the same conditions as described under Example 4. The film web is predried in order to obtain a comparable residual solvent content of less than 0.5% by weight (VDE 0345). According to DIN 53,455 (200 mm/minute forward speed), an elongation at break of 22% and a tensile strength of 69.6 N/mm² and thus considerably lower values than in Example 4 are measured for this non-stretched conductive polycarbonate film.

In this connection, it is also found that the production of electrically conductive cast polycarbonate films with contents of, for example, more than 20% by weight of conductive carbon black can scarcely still be carried out on a industrial scale in the thickness range below 10 μm because of frequent tears in the film webs.

EXAMPLE 5

The carbon black-filled polycarbonate film produced according to Comparison Example A with an average thickness of about 9 μm (carbon black content about 27% by weight of the carbon black as characterised in Example 1) is stretched, without predrying, with a residual methylene chloride content of 1.2% (weight loss ½ hour/160° C.) by single-nip stretching under the following conditions to give electrically conductive polycarbonate films 6 μm (I) and 4 μm (II) thick, which have high mechanical strengths. The increase in the surface resistance at the higher stretching ratio is shown in the table.

TABLE 4

|  | I | II |
| --- | --- | --- |
| Stretching temperature (°C.) | 220 | 220 |
| Stretching ratio ($V_1:V_2$) | 1:1.5 | 1:2.0 |
| average film thickness (μm) | 5.8-6.2 | 3.6-4.0 |
| Elongation at break (%) | 36 | 24 |
| Tensile strength (M/mm²) | 96 | 141.7 |
| Surface resistance (Ω/sq; four-point measurement, at 20-25° C.) | 3800 | 55000 |

These very thin electrically conductive polycarbonate films are distinguished by high surface glosses and can no longer be produced by a casting, extrusion or blow-moulding method in this thickness range with carbon black contents of, for example, more than 20% by weight.

EXAMPLE 6

A conductivity carbon black with a BET surface area of 1,000 m$^2$/g and a DBP adsorption of 400 ml/100 g is very finely dispersed in a bisphenol A/bisphenol Z copolycarbonate methylene chloride solution, the content of the electrically conductive carbon black—based on the total solids content—being 10% by weight. The polycarbonate used is that of Example 1, but with a $\eta_{rel}$ of 2.20 (5 g/l of CH$_2$Cl$_2$ at 25° C., measured in a Ubbelohde viscometer with a capillary diameter of 0.3 mm). After filtration, the resulting dispersion is cast, with a viscosity of 10,500 mPas (at 20° C.) to carbon black-filled polycarbonate films 45 μm (I) and 30 μm (II) thick.

The carbon black-filled 45 μm thick polycarbonate film (I) is stretched in the longitudinal direction by single-nip stretching in a ratio of the feed speed (V$_1$) to the delivery speed (V$_2$) of 1:1.5 at a stretching temperature of 220° C. to give a film about 30 μm thick. According to DIN 53,455 (200 mm/minute forward speed), considerably improved elongations at break and tensile strengths are found in a tensile test for the polycarbonate film stretched according to the invention in comparison with the non-stretched film (II) of the same thickness of about 30 μm. The surface resistance of the polycarbonate film after the stretching process is 2100Ω/sq (tour-point measurement) in comparison with 1350Ω/sq for the non-stretched film (II).

EXAMPLE 7

Under the conditions described in Example 6, an electrically conductive polycarbonate film with a carbon black content of 30% by weight of the same type as in Example 6 is produced in a thickness of 40 μm and has a surface resistance of 55Ω/sq at room temperature and a residual solvent content (weight loss according to VDE 0345) of 1.8% by weight.

This film is stretched on a Hofmann und Schwabe stretching machine with a ratio of V$_1$:V$_2$=1:1.33 at a temperature of the middle stretching roll of 220° C. (stretching temperature) by single-nip stretching to give an approximately 30 μm polycarbonate film according to the invention, which then has a surface resistivity of 86Ω/sq and has considerably better mechanical strengths, with a tensile strength of more than 60 N/mm$^2$ and an elongation at break of over 20% (tensile test corresponding to DIN 53,455; 200 mm/minute forward speed) compared with a non-stretched 30 μm polycarbonate film—produced from the same dispersion and hence with the same degree of carbon black filling.

EXAMPLE 8

An electrically conductive cast polycarbonate film 30 μm thick is produced under the conditions described in Example 3, and contains a very finely dispersed carbon black content of 15% by weight, this conductivity carbon black having a pronounced structure, that is to say a chain-like arrangement of the primary particles, an average particle size of 35 nanometers (nm) and a BET surface area of 70 m$^2$/g. This film of bisphenol A homopolycarbonate ($\overline{M}_w$ about 180,000; $\eta_{rel}$ 2.21) is stretched with a residual methylene chloride content of 1.5% by weight (VDE 0345) by single-nip stretching at 210° C. at a stretching ratio of 1:1.5 to give a film with an average thickness of 20 μm.

The surface resistance of the stretched conductive polycarbonate film is 3400Ω/sq and the mechanical strengths, with values of greater than 75% elongation at break and greater than 80 N/mm$^2$ tensile strength, are considerably improved in comparison with a non-stretched 20 μm thick comparison film of the same composition (tensile strength according to DIN 53,455).

EXAMPLE 9

An electrode graphite powder with a particle distribution up to 0.4 mm particle diameter is very finely dispersed in a solution of the copolycarbonate described in Example 6 (Ωrel=2.20; bisphenol A base with 0.5 mol % of bisphenol Z) in methylene chloride with a content of 40% by weight, based on the total solvents, and, after filtration over a 50 μm polyamide fabric, the dispersion is cast to a film with an average thickness of 20 μm and a surface resistance of 11,600Ω/sq. By longitudinal stretching at a temperature of 220° C. and a stretching ratio V$_1$:V$_2$ of 1:1.33, a resistant film with a surface resistance of 18,200Ω/sq and an average thickness of 15 μm is obtained, the film having considerably increased mechanical strengths in a tensile test according to DIN 53,455 in comparison with a non-stretched comparison film of the same composition and thickness.

We claim:

1. A polycarbonate film having a surface resistivity of 1 to 10$^9$Ω and a thickness of 0.002 mm to 0.4 mm containing carbon black or graphite in an amount of 10 to 40% by weight, obtained by a process comprising dispersing the corresponding amount of carbon black or graphite in a solution of a thermoplastic aromatic polycarbonate with a Mw (weight average molecular weight) of 20,000 to 300,000, producing a cast film of 0.004 mm to 0.42 mm thickness and stretching the cast film monoaxially or biaxially by at least 5% to at most 250%, said polycarbonate film being characterized in that its elongation at break is greater than that of a corresponding unstretched similarly filled film having an identical thickness.

2. The film according to claim 1 containing carbon black or graphite in an amount of 20 to 35% by weight.

3. The film according to claim 1 obtained by a process comprising dispersing carbon black having a BET surface area of more than 50 m$^2$/g and a DBP adsorption of more than 80 ml/100 g with an average primary particle size of less than 50 nm.

4. The film according to claim 1 obtained by a process comprising dispersing the carbon black or graphite in a solution of a thermoplastic aromatic polycarbonate of bisphenol A which contains 0 to 5 mol %, based on mols of diphenol, of co-condensed bisphenol Z.

5. The film according to claim 1 obtained by a process comprising producing a cast film of 0.006 to 0.3 mm thickness.

6. The film according to claim 1 obtained by a process comprising producing a cast film of 0.01 to 0.2 mm thickness.

7. The film according to claim 1 obtained by a process comprising stretching the cast film monoaxially or biaxially by 10% to 200%.

* * * * *